(12) United States Patent
Clawson et al.

(10) Patent No.: US 7,367,996 B2
(45) Date of Patent: May 6, 2008

(54) HEAT TRANSFER OPTIMIZATION IN MULTI SHELLED REFORMERS

(75) Inventors: Lawrence G. Clawson, Dover, MA (US); Mark R. Hagan, Somerville, MA (US); Chunming Frank Qi, Lexington, MA (US); William F. Northrop, Somerville, MA (US)

(73) Assignee: Nuvera Fuel Cells, Inc., Billerica, MA (US)

( * ) Notice: Subject to any disclaimer, the term of this patent is extended or adjusted under 35 U.S.C. 154(b) by 880 days.

(21) Appl. No.: 10/012,195

(22) Filed: Dec. 5, 2001

(65) Prior Publication Data

US 2002/0182457 A1 Dec. 5, 2002

Related U.S. Application Data (63) Continuation-in-part of application No. 09/870,412, filed on May 30, 2001, now Pat. No. 6,921,595.

(51) Int. Cl.
*B01J 7/00* (2006.01)
*B01J 19/00* (2006.01)

(52) U.S. Cl. .............. 48/61; 48/127.9; 48/94; 48/102 A; 422/129; 422/188; 422/196; 422/198; 422/200; 422/201; 422/205

(58) Field of Classification Search .............. 48/197, 48/94; 422/198, 202, 203, 204; 423/652; 431/207
See application file for complete search history.

(56) References Cited

U.S. PATENT DOCUMENTS 3,144,312 A * 8/1964 Mertens .......... 48/95
3,541,729 A * 11/1970 Dantowitz ........ 48/94
4,098,588 A 7/1978 Buswell et al.
5,458,857 A 10/1995 Collins et al.
5,676,911 A 10/1997 Baumert et al.
6,221,117 B1 4/2001 Edlund et al.
6,544,494 B2 4/2003 Goebel et al.
6,548,029 B1 4/2003 Towler et al.
6,793,698 B1 * 9/2004 Sanger et al. .......... 48/127.9
6,835,354 B2 * 12/2004 Woods et al. .......... 422/139

FOREIGN PATENT DOCUMENTS

| EP | 0 600 621 A1 | 6/1994 |
| EP | 0 615 949 A2 | 9/1994 |
| EP | 0 922 666 A1 | 6/1999 |
| EP | 1 094 030 A2 | 4/2001 |
| EP | 1 094 031 A1 | 4/2001 |
| JP | 6211501 | 8/1994 |
| WO | WO 98/08771 | 3/1998 |
| WO | WO 98/08771 * | 5/1998 |
| WO | WO 02/47464 A2 | 6/2002 |

* cited by examiner

*Primary Examiner*—Alexa Neckel
*Assistant Examiner*—Kaity Handal
(74) *Attorney, Agent, or Firm*—Finnegan Henderson Farabow Garrett & Dunner LLP (57) ABSTRACT

A hydrocarbon fuel processing reactor for generating a hydrogen-enriched reformate from hydrocarbons is disclosed. A plurality of shells are arranged coaxially having a gap defined between each of the successive shells, thereby forming a plurality of coaxial zones. The shells are configured to permit heat transfer from one zone to another. Fluid streams for reactions within the reactor are preheated by heat transfer from adjacent zones.

8 Claims, 5 Drawing Sheets

HEAT TRANSFER OPTIMIZATION IN MULTI SHELLED REFORMERS

RELATED APPLICATIONS

This application is a continuation-in-part of U.S. application Ser. No. 09/870,412, filed May 30, 2001 now U.S. Pat. No. 6,921,595.

TECHNICAL FIELD

The present invention is generally related to hydrocarbon fuel reformers for reforming a gaseous or liquid hydrocarbon fuel into a hydrogen-enriched product stream or reformate for use in, among other things, a hydrogen fuel cell. More particularly, the invention is directed to an improved reformer consisting of coaxially arranged zones, through which reactants and processed streams are cooperatively flowed to accomplish necessary reactions, preheating and thermal efficiency.

BACKGROUND OF THE INVENTION

Reforming of hydrocarbon fuels to make hydrogen is well known in the art. Conventionally, hydrocarbons are reformed predominately in large-scale industrial facilities providing hydrogen for bulk storage and redistribution, or producing hydrogen as an on-line, upstream reagent for another large-scale chemical process. For the most part, these prior processes operate continuously and at steady-state conditions.

More recently, however, a strong interest has developed in providing hydrocarbon-reforming reactors integrated with an end use of the hydrogen. Also, there is a strong interest to develop a low-cost, small-scale source for hydrogen that can replace the need for storing hydrogen gas on site or on board. More particularly, a great interest has developed in providing reactors for producing hydrogen, which can be integrated with a fuel cell which uses hydrogen as a fuel source to generate electricity. Such hydrogen generator/fuel cell systems are being pursued for stationary uses such as providing electrical power to a stationary facility (home or business), for portable electric power uses, and for transportation.

In mobile applications such as a vehicle, or in any "power on demand" system, such as a backup electric power supply, the system must run these reactions continuously at variable demands for total hydrogen production. In addition, the system must be inexpensive and easy to assemble and maintain. In effect, it must cost and act more like an automobile engine, and less like a small chemical plant.

Reactions used to generate hydrogen enriched gas from hydrocarbons, including those for treating such product gases to increase the hydrogen concentration or reduce carbon monoxide include partial oxidation (with or without a catalyst), steam reforming, water gas shift reactions, and selective or preferential oxidation. Of these, only steam reforming is not exothermic. Hence to increase or optimize an integrated reactor's efficiency the heat generated by any of the exothermic reactions needs to be used for useful work, such as for preheating reactants or reactions. One example is to use the heat from partial oxidation to drive a steam reforming reaction, to provide autothermal reforming "ATR."

Also, it is common to control temperatures of exothermic reactions by heat transfer to a cooling heat transfer medium.

In some reactors, particularly reactors providing steam reforming, auxiliary heat provided by a burner may be desirable or necessary to drive the steam reforming. Even with reactors employing ATR may benefit from an auxiliary burner to enhance performance during start up or transient load conditions. Additionally, burners are commonly used to burn the anode gas from a fuel cell.

In addition, if such a reactor is integrated with a fuel cell, by product heat from the fuel cell must also be used efficiently.

The plumbing conventionally employed to accomplish all of the heat transfers necessary, available, or desirable in an integrated reactor or integrated reactor and fuel cell (including coiled tubes, fins, tube clusters, pool boilers, and detached heat exchangers) can be difficult to assemble and maintain, and increase the cost and size of an integrated unit.

The present invention addresses the above short comings in the art provides other advantages as will be understood by those in the art in view of the following specification and claims.

SUMMARY OF THE INVENTION

According to one aspect of the invention, there is a reactor for generating a hydrogen-enriched reformate from hydrocarbons includes a core reaction zone, the core reaction zone being configured to conduct exothermic reactions including at least one of combustion, partial oxidation, autothermal reforming, water gas shift, and preferential oxidation. Shells, each having a shell wall, are arranged coaxially about the core reaction zone. A gap is defined between each of the shells' walls to form a plurality of coaxial zones. This reactor configuration permits heat transfer directly from one zone to another. A hydrocarbon feed stock is preheated from a temperature of about its storage temperature substantially to a desired preheat temperature by traversing a first zone. An oxygen containing gas is preheated from a temperature of about its storage temperature substantially to its desired preheat temperature by traversing a second zone.

According to another aspect of the invention, a reactor for generating a hydrogen-enriched reformate from hydrocarbons includes a core reaction zone, the core reaction zone being configured to conduct exothermic reactions including at least one of combustion, partial oxidation, water gas shift, autothermal reforming and selective oxidation. This reactor includes a steam reformer in the core reaction zone. The reactor also includes a burner. Shells are arranged coaxially about the core reaction zone with a gap being defined between each of the successive shells to form a plurality of coaxial zones. The shells are configured to permit heat transfer directly from one zone to one or more adjacent zones. A hydrocarbon fuel is flowed through a first zone, an oxygen containing gas for partial oxidation is flowed through a second zone, water/steam is flowed through a third zone, exhaust from the burner is flowed through a fourth zone, an oxygen containing gas for combustion in the burner is flowed through a fifth zone, and a burner fuel is flowed through a sixth zone.

According to another aspect of the invention, a method of reforming hydrocarbons to provide a hydrogen rich stream includes generating heat by performing at least one of combustion, partial oxidation, water gas shift, autothermal reforming and selective oxidation. This heat is then transferred through walls of a plurality of shells nested coaxially about each other and defining a gap between each of the successive shells to form a plurality of coaxial zones. A stream of hydrocarbon feed stock is preheated in a first zone.

Streams of steam and oxygen containing gas are preheated respectively in separate second and third zones. The preheated hydrocarbon feed stock and steam are introduced to a reforming zone which may be in one of the coaxial zones or in a core reaction zone. The preheated oxygen containing gas is used in an oxidation reaction.

According to another aspect of the present invention, a reactor for generating a hydrogen-enriched reformate from hydrocarbon feed stocks including shells each having a shell wall arranged coaxially about each other. A gap is defined between each of the successive shells forming a plurality of coaxial zones. The shells are configured to permit direct heat transfer from one zone to another. A first zone is configured to conduct steam reforming and at least one or more of the exothermic reaction chosen from the group including combustion, partial oxidation, autothermal reforming, water gas shift, and preferential oxidation. A hydrocarbon feed stock is preheated in a second zone and an oxygen containing gas is preheated in a third zone.

According to another aspect of the present invention, a reactor for generating a hydrogen-enriched reformate from hydrocarbons includes a core reaction zone configured to conduct steam reforming. Shells are arranged conaxilly about the core reaction zone with a gap being defined between each of the successive shells to form a plurality of coaxial zones. The shells are configured to permit heat transfer from one zone to another. A burner is included and configured to generate a heated exhaust gas stream. A hydrocarbon feed stock is preheated in a first zone, and an oxygen containing gas is preheated in a second zone. The burner exhaust is routed through a third zone disposed between the first and second zones. Heat from the exhaust is transferred to the first and second zones through the shared walls.

According to another aspect of the present invention, a method for reforming hydrocarbons to produce a hydrogen rich reformate includes routing a first reforming reactant stream through a first gap coaxially disposed about a first shell having a wall and defining a core reaction zone containing a steam reformer. The temperature within the core reaction zone is higher than the temperature of the first reforming reactant flowing through the first gap. The first reforming reactant flows through the first gap and then to the core reaction zone. The first reforming reactant is in one embodiment a hydrocarbon feedstock.

According to another aspect of the present invention, a reactor for reforming hydrocarbons to produce a hydrogen rich reformate including a plurality of nested shells each having an annular wall and having a gap between each adjacent wall defining a zone. The reactor is configured such that each zone contains a different heat transfer medium. The heat transfer mediums travel through the zones and exchange heat by conduction through shell walls.

According to another aspect of the present invention, a reactor for the reforming of hydrocarbons into a hydrogen rich product comprising a plurality of nested shells having a gap defined between each of the successive shells to form a plurality of coaxial zones between adjacent shells. A stream of heated material produced by an exothermic reaction including at least one of combustion, partial oxidation, autothermal reforming, water gas shift, and preferential oxidation is routed through one of the zones. A second stream of heated material produced by a second exothermic reaction including at least one of combustion, partial oxidation, autothermal reforming, water gas shift, and preferential oxidation is routed through one of the zones. The zones through which the heated material streams are routed are adjacent to at least one zone through which flows a stream chosen from the group of a hydrocarbon feedstock, steam, oxygen containing gas, and anode gas According to another aspect of the present invention, a reactor for generating a hydrogen-enriched reformate from hydrocarbons includes a plurality of nested shells having walls arranged coaxially and defining gaps between each of the successive shells to form a plurality of coaxial zones. The shells are configured to permit heat transfer from one zone to another. An end cap having multiple channels defined by stacked plates terminates the zones in a manner which provides further routing for materials flowing through the zones to enter other zones or to enter or exit the reactor.

According to another aspect of the present invention, a reactor for generating a hydrogen-enriched reformate from hydrocarbons includes a core reaction zone, the core reaction zone being configured to conduct exothermic reactions including at least one of combustion, partial oxidation, autothermal reforming, water gas shift, and preferential oxidation. Shells are arranged coaxially about the core reaction zone with a gap being defined between each of the successive shells to form a plurality of coaxial zones, the shells being configured to permit heat transfer from one zone to another. The reactor also includes an end cap through which materials are inlet and outlet from the reactor, and in which material is routed between zones.

According to another aspect of the present invention, a reactor for generating a hydrogen-enriched reformate from hydrocarbons including a plurality of nested shells having walls arranged coaxially and defining a gap between each of the successive shells forming a plurality of coaxial zones. The shells are configured to permit heat transfer from one zone to another. A first zone contains a catalyst selected from the group including a steam reforming catalyst and a shift catalyst. The reactor is further configured so that a hydrocarbon feed stock is preheated in a second zone, and an oxygen containing gas is preheated in a third

BRIEF DESCRIPTION OF THE SEVERAL FIGURES

The following descriptions of the present invention are discussed with particular reference to the appended drawings of which.

DETAILED DESCRIPTION OF THE INVENTION

The features and details of the invention will now be more particularly described with reference to the accompanying drawings. The same numeral present in different figures represents the same item. It will be understood that the particular embodiments of the invention are shown by way of illustration and not as limitations of the invention. The principal features of this invention can be employed in various embodiments without departing from the scope of the invention. The detailed preferred embodiments described in this disclosure are not intended to limit the present invention to these examples, but rather are intended to demonstrate the principles of the invention as applied within specific embodiments. Additionally, to describe the various features of this invention, zones are identified throughout such as a first zone, a second zone, etc. These identifications are specific to the specific embodiment being described. Different materials flow through different zones in different embodiments, and as such the various zones have been renamed or renumbered for different embodiment where it promotes clarity. Likewise, unless otherwise stated in the claims, the designation of "first," "second," etc. is to be applied that does not indicate order or succession.

Figure 1:
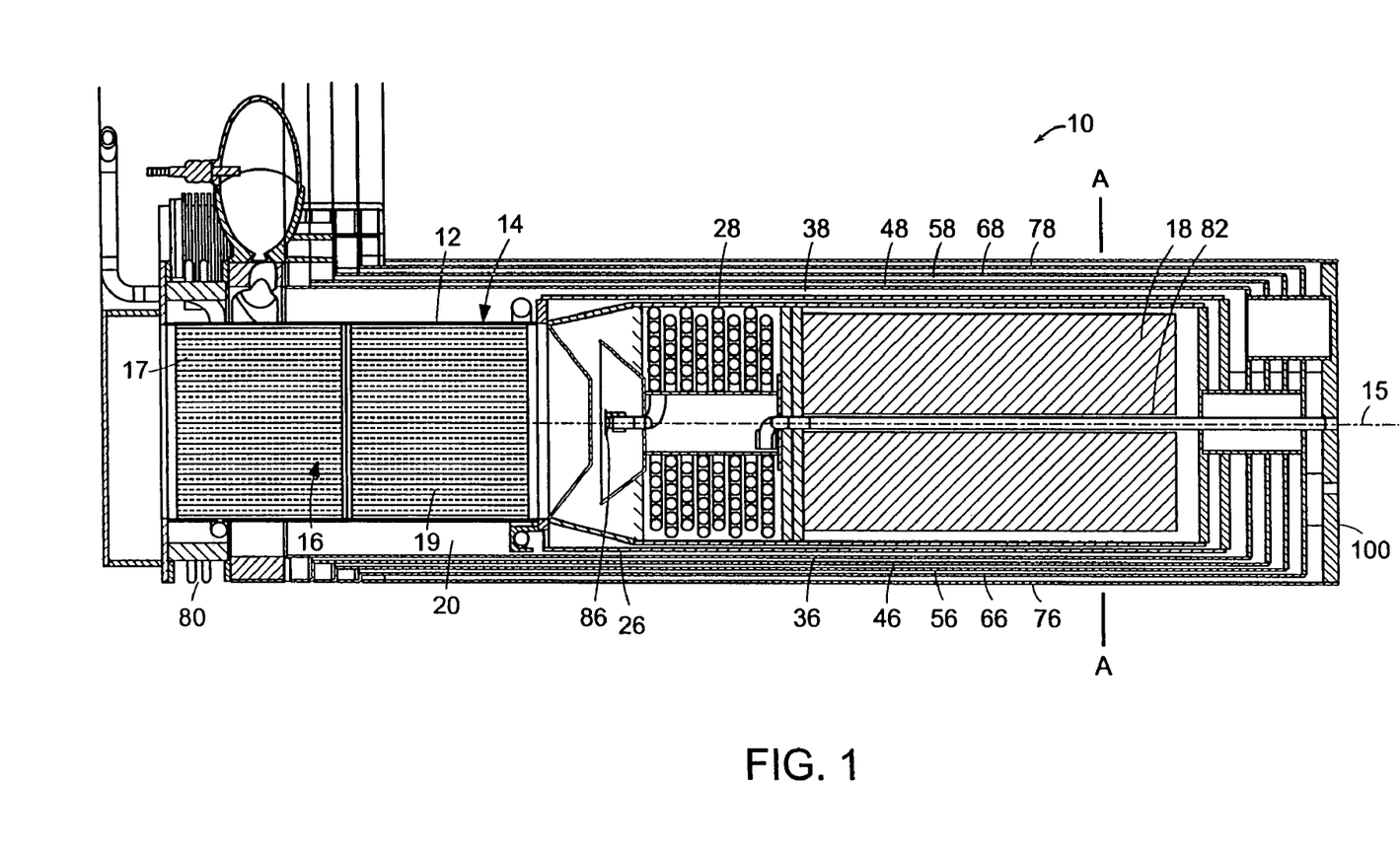
FIG. 1 is a side cross sectional view showing one embodiment of a reactor according the present invention.

FIG. 1 discloses a particular reactor (10) embodying the invention. The reactor (10) has a first shell (12), within which is located a core reaction zone (14), located innermost in a series of shells (12,26,36,46,56,66,76) coaxially arranged around central axis (15). The core reaction zone (14) in this embodiment includes an autothermal reformer (16) (ATR), and a high temperature shift bed (18) (HTS). A burner (20) is adjacent the first shell (12). The ATR (16) includes a steam reforming catalyst (17) on a monolithic support and a partial oxidation section (19) on a monolithic support, which combined provide autothermal reforming (ATR). The reforming catalysts may be any of those which are well known in the art, preferably including $Pd/Al_2O_3$. Metal on support catalysts using metals such as platinum (Pt), palladium (Pd), or nickel (Ni) are common. The catalyst used may be pellets, powder, or any other of the forms well known in the art. The exothermic POx reaction is self-sustaining, and under ideal conditions maintains an operating temperature range of from about 700° to about 1200° C. for in a catalyzed POx reaction. Heat from this reaction is then used to drive the steam reforming reaction.

The shell (26) found directly radially outward from the most interior shell (12) forms a zone (28) between its inner surface, and the outer surface of the innermost shell (12). A stream of hydrocarbon feed stock runs through the zone (28). The wall of the shell (12) allows heat generated within the core reaction zone (14) to be conductively transferred through the shell (12) wall to the zone (28). The hydrocarbon feed stock flowing through the zone (28) is heated as it travels through the zone (28) by the conducted heat from the core reaction zone (14). Preferably, steam is preheated along with the hydrocarbon feedstock. The flow of a hydrocarbon feed stock and water/steam is preferably countercurrent to the direction of flow through the core reaction zone (14), while the flow of burner exhaust is preferably concurrent with the fluid flow through the core reaction zone (14).

The shell (36) found directly radially outward from the more interior shell (26) forms a zone (38) between its inner surface and the outer surface of the shell (28). A stream of exhaust from the burner (20) flows through the zone (38). The burner exhaust is hotter than the hydrocarbon feed stock flowing through zone (28). The wall of the shell (26) allows the heat of the stream of burner exhaust to be transferred through the wall into the hydrocarbon feed stock flowing through the zone (28). In this embodiment, the hydrocarbon feed stock therefore receives heat from both the core reaction zone (14), and the burner exhaust stream of zone (38). In one embodiment the hydrocarbon feedstock is methane. Suitable fuels include a range of hydrocarbons, which encompasses alcohols. Possible fuels include, but are not limited to, gasoline, kerosene, JP-8, methane, propane, methanol and ethanol.

Preferably, the hydrocarbon feed stock is preheated in this way from about its storage temperature substantially to its desired preheat temperature by traversing a first zone.

The shell (46) found directly radially outward from the more interior shell (36) forms a zone (48) between its inner surface and the outer surface of the shell (38). A stream of air flows through the zone (48). The air enters the zone (48) at ambient temperature, which is the storage temperature when the air is drawn from the environment. The burner exhaust flowing through zone (38) is hotter than this air. The wall of the shell (36) allows the heat of the stream of burner exhaust to be conducted through the wall into the air flowing through the zone (48). The air is heated as it travels through the zone (48) by the conducted heat from the burner exhaust. The now-heated air exits the zone (48) and is routed to the ATR (16).

The shell (56) found directly radially outward from the more interior shell (46) forms a zone (58) between its inner surface and the outer surface of the shell (48). Another stream of ambient air flows through the zone (58). This air stream becomes heated and exits the zone (58) and is routed to the burner (20).

The shell (66) found directly radially outward from the more interior shell (56) forms a zone (68) between its inner surface and the outer surface of the shell (58). Anode exhaust from a fuel cell (not shown), flows through the zone (68). The anode exhaust, which contains hydrogen gas is used as fuel burned in the burner (20). The incoming anode gas is hotter than the air flowing through the zone (58) located interior to the zone (68) through which the anode exhaust is flowing. The wall of the shell (56) separating these zones conducts the heat from the zone (68) having anode exhaust to the air flowing through the more interior zone (58). The now heated air exits the zone (58) and is routed to the burner (20).

It should be appreciated that the various fluids necessary to providing hydrogen (e.g. fuel, steam, air, etc.) also act as heat transfer fluids transferring heat between zones. It should also be noted that during certain operating conditions heat transfer between zones may be arranged to occur advantageously in reverse depending on the relative temperatures of the heat transfer fluids (e.g. anode gas, air, hydrocarbon fuel, steam/water, etc.).

In this embodiment, the outermost shell (76), found radially outward from the more interior shell (66) forms a zone (78) between its inner surface and the outer surface of the shell (68). Reformate, which is exhaust from the HTS (18) of the core reaction zone (14), flows through the outermost zone (78). The reformate, upon exiting the HTS (18), is at an elevated temperature relative to the anode exhaust flowing through zone (68). The anode exhaust is used as burner fuel, and it is advantageous to preheat it in order to facilitate combustion in the burner (20). The wall of the shell (66) separating the outermost zone (78), and the more interior zone (68) conducts heat from the zone (78) having reformate, to the anode exhaust flowing through the more interior zone (68).

In a preferred embodiment, expansion bellows (80) are incorporated into the shell structure of the reactor (10). The stainless steel used to construct this reactor expands when it is subjected to heating, and the expansion bellows (80) allow for this expansion without weakening or otherwise damaging the integrity of the reactor (10).

An end cap (100) is located at one end of the reactor (10). The end cap (100) terminates the shells (12,26,36,46,56,66, 76) and routes the fluid streams by manifolding between streams or providing inlets or outlets.

Within the core reaction zone (14), steam may be optionally added to the reformate flowing between the ATR (16) and the HTS (18). Addition of steam promotes the favorable production of hydrogen in the water gas shift reaction. To add steam, a tube (82) having an inlet (84) is routed through the HTS (18). The tube (82) coils and has an outlet (86) where steam is added to the reformate. Providing steam to the reformate prior to entry to the HTS is optional. In addition, many different means for adding steam to the reformate are well known if it is desired that steam be added.

In another embodiment of the present invention a heat exchange tube may be routed through the reforming zone of the reactor as a means of controlling the temperature within the reactor. The tube contains a heat transfer medium. It may provide heat to the reforming zone during startup or transients in operation depending on the energy need of the system.

Figure 2:
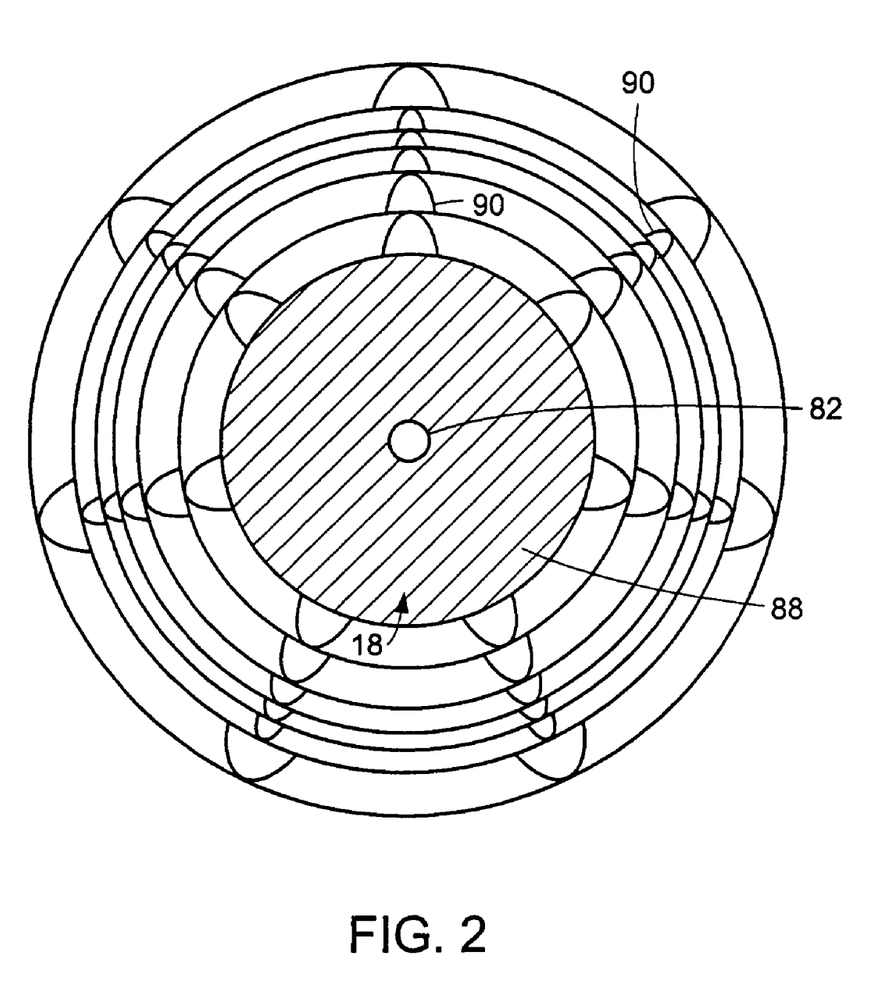
FIG. 2 is a cross sectional view of the reactor taken along line A-A of FIG. 1.

FIG. 2 discloses that in addition to the shells (12,26,36,46,56,66,76), steam tube (82) carries water/steam through catalyst bed (88) of the HTS (18).

FIG. 2 also discloses dimples (90) extending from the surfaces of the various shells (12,26,36,46,56,66,76). The dimples (90) are present in each of the gaps to maintain spacing. In addition to the dimples used as spacers in this embodiment, spacers may also be rods which run through the gaps along the long axis of the reactor, flat or undulating screens placed in the gaps, or any other suitable spacers. The dimples or other spacers also promote turbulent flow and increase heat transfer efficiency. The flow of material through the gaps is preferably predominantly turbulent. In the preferred embodiment of the present invention, the shells (12,26,36,46,56,66,76) have a circular cross section. However other cross sectional shapes may be used for the same beneficial results such as triangular, rectangular, obround, etc.

Figure 3A:
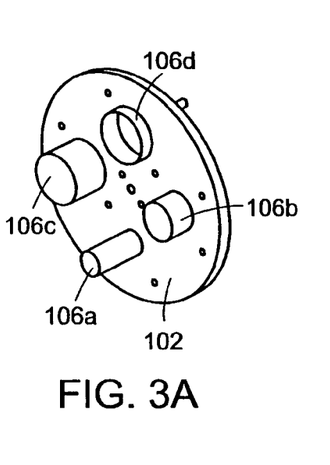
FIGS. 3A-3H illustrate an end cap assembly according to one embodiment of the present invention.
Figure 3B:
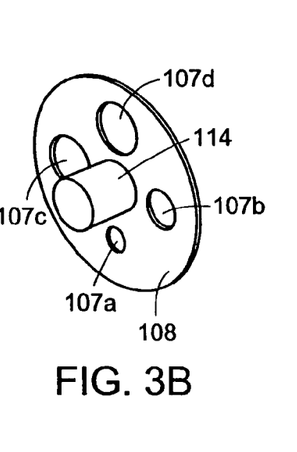
Figure 3C:
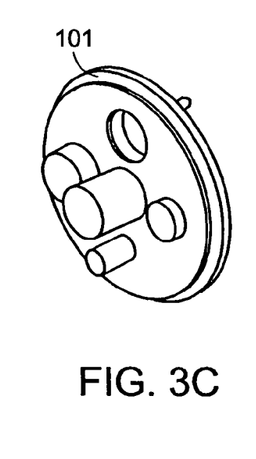
Figure 3D:
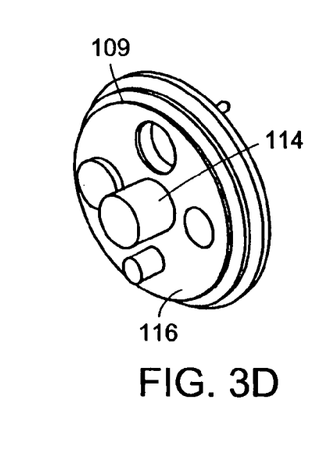
Figure 3E:
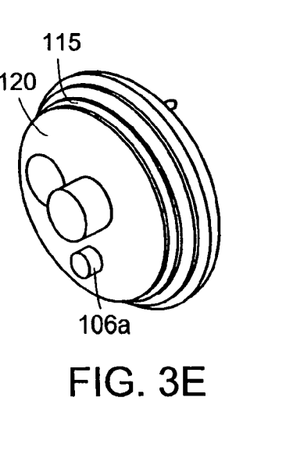
Figure 3F:
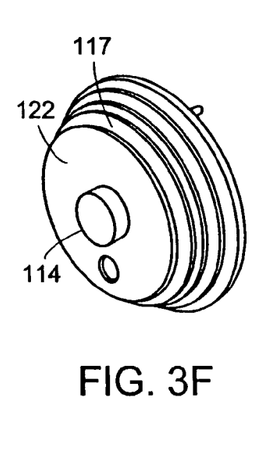
Figure 3G:
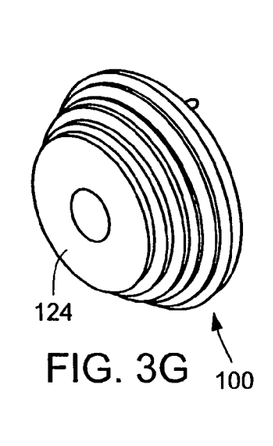
Figure 3H:
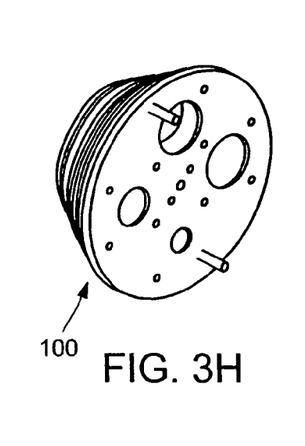

In another embodiment of the present invention, the routing of the various streams is facilitated by the use of an end cap (100) as shown in FIGS. 3a-h. The end cap shown in FIGS. 3a-h is not intended for use with the embodiment of FIG. 1, as this end cap contains only six gaps as opposed to the seven gaps of the embodiment shown in FIG. 1. In this embodiment, ATR air and burner air are preheated together within a single gap, thus eliminating one gap. FIGS. 3a-f shows the end cap (100) in various stages of construction. A front view of a complete end cap (100) is shown in FIG. 3g, and a rear view of a complete end cap (100) is shown in FIG. 3h.

FIG. 3a shows a first plate (102) which is the outermost plate from a first innermost zone when the end cap (100) is incorporated into a fuel reformer reactor. The plate (102) contains inlet/outlets having pipes (106) of varying lengths extending from holes in plate (102). The second plate (108) is shown in FIG. 3b. The second plate (108) has holes corresponding to the pipes (106) of the plate (102) of FIG. 3a. In addition, the plate (108) has a hole from which another pipe (114) extends. FIG. 3c shows plates (102) and (108) welded together. FIG. 3d shows a third plate (116) welded to the first and second plates. FIGS. 3e and 3f show additional plates (120) and (122) welded to the end cap (100). FIG. 3g shows a front view of the completed end cap (100) with the final plate (124) in place. The pipes (106) of varying lengths are situated to provide fluid communication between the inlet/outlets and the various channels created by the spaced plates (102,108,116,120,122,124). In this embodiment, pipe (114) of FIG. 3b connects a core reaction zone to the outermost channel. In the preferred embodiment, the number of plates is equal to the number of zones, including the core reaction zone, in the reactor.

One method of manufacturing a fuel cell reformer according to the present invention includes the incorporation of the end cap (100) of FIG. 3g into a fuel cell reformer having multiple shells which are arranged concentrically. Each plate (102,108,116,120,122,124) of the end cap (100) is welded along its periphery to a shell of the reactor to form a leak free seal.

Figure 4:
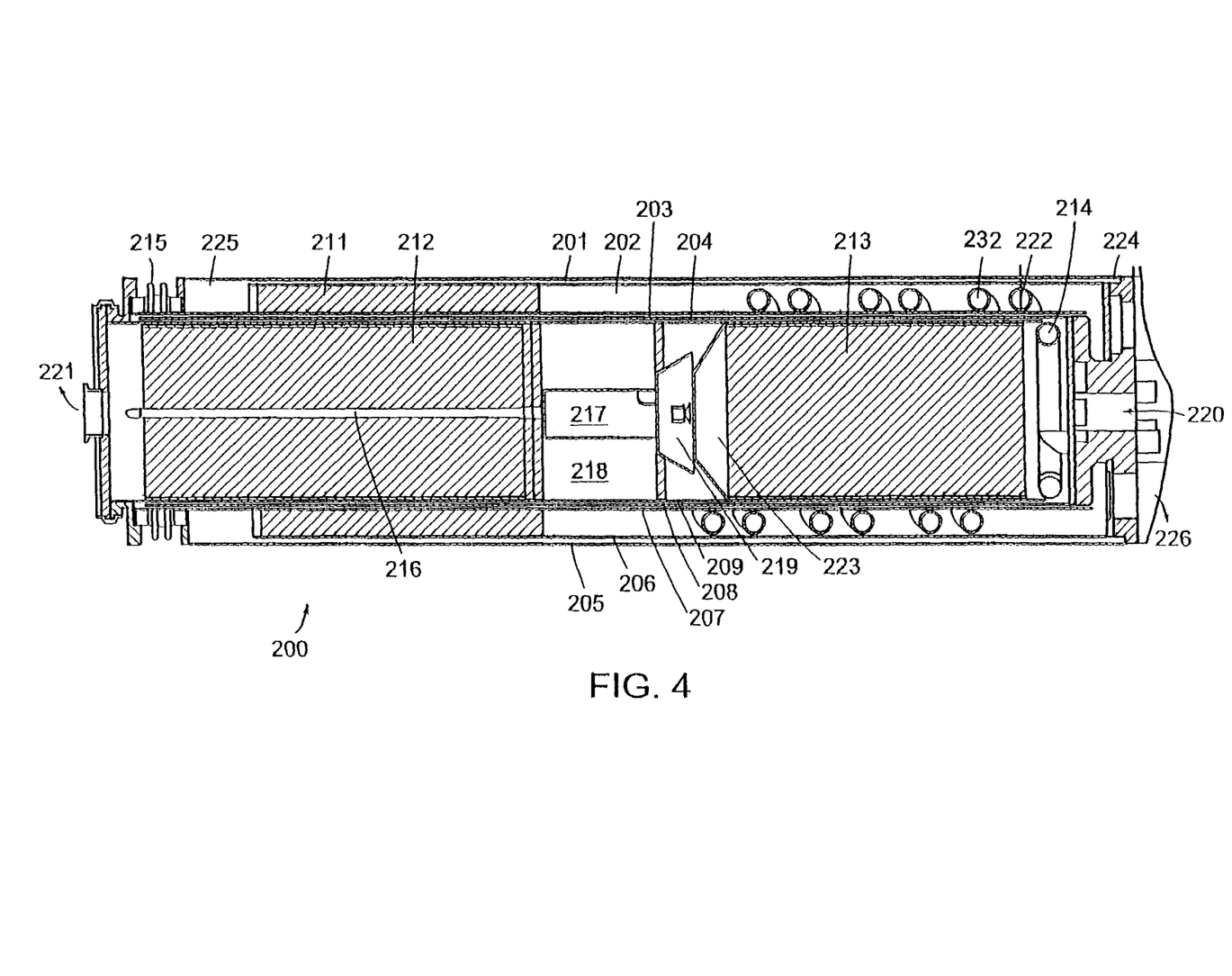
FIG. 4 is a side cross sectional view showing another embodiment of a reactor according to the present invention.

Another embodiment of a multishelled reactor is shown in FIG. 4. FIG. 4 shows a side view cutaway of the reactor (200). Annular zones (201,202,203,204) are located in the gaps between the shells (205,206,207,208,209). Inside shell 209 are two components, a HTS (212) and an ATR zone (213). These components are separated by a mixing area (217,218) and a vaporization area (219). Tube (216) carries water to be evaporated in the hot reformate flowing from the ATR (213). Tube (214) is an inlet for a fuel/steam mixture into the ATR (213). This fuel/steam mixture is preheated in coiled tubes (232,222) and is connected by manifolding (not shown) to tube (214). In another embodiment, the fuel and steam may be combined earlier. In such a reactor they may be combined prior to introduction to the reactor. Air enters at air inlet (220) and flows through zone (203) and returns through zone (204), and is heated through the shell (209, 208) walls by heat generated in the ATR (213), the HTS (214), and the integrated burner (211).

The oxygen containing gas flows out of zone (204) over circular tube (214), mixing with the fuel/steam mixture which flows from tube (214). The fuel/steam/air mixture then enters the ATR (213) and simultaneously generates heat and is reformed. The reformate leaves the ATR (213) at area (223) and mixes with additional water in zone. The water comes from tube (216) and is present in mixing area(217), where the water from tube (216) is atomized, and is evaporated at area (223) by the hot reformate. The reformate with additional steam passes over cooling coils in zone (218) (coils not shown), and passes into the HTS (212). The shifted reformate then exits the reformer at outlet (221).

Burner fuel in the form of anode exhaust enters the reformer (200) at inlet (224) and passes through zone (201), and is preheated there through shell (206) by heat from zone (202). The hydrogen is mixed with air introduced into chamber (225) and passes into burner (211), where heat is produced. The exhaust from the burner flows through zone (202) and over the coils of tubes (232, 222) in which the reformer fuel/steam mixture is flowing, and the cooled exhaust leaves the reformer at outlet (226). One expansion bellows (215) is provided, and is sufficient to prevent differential expansion from putting pressure on any of the shells.

Figure 5:
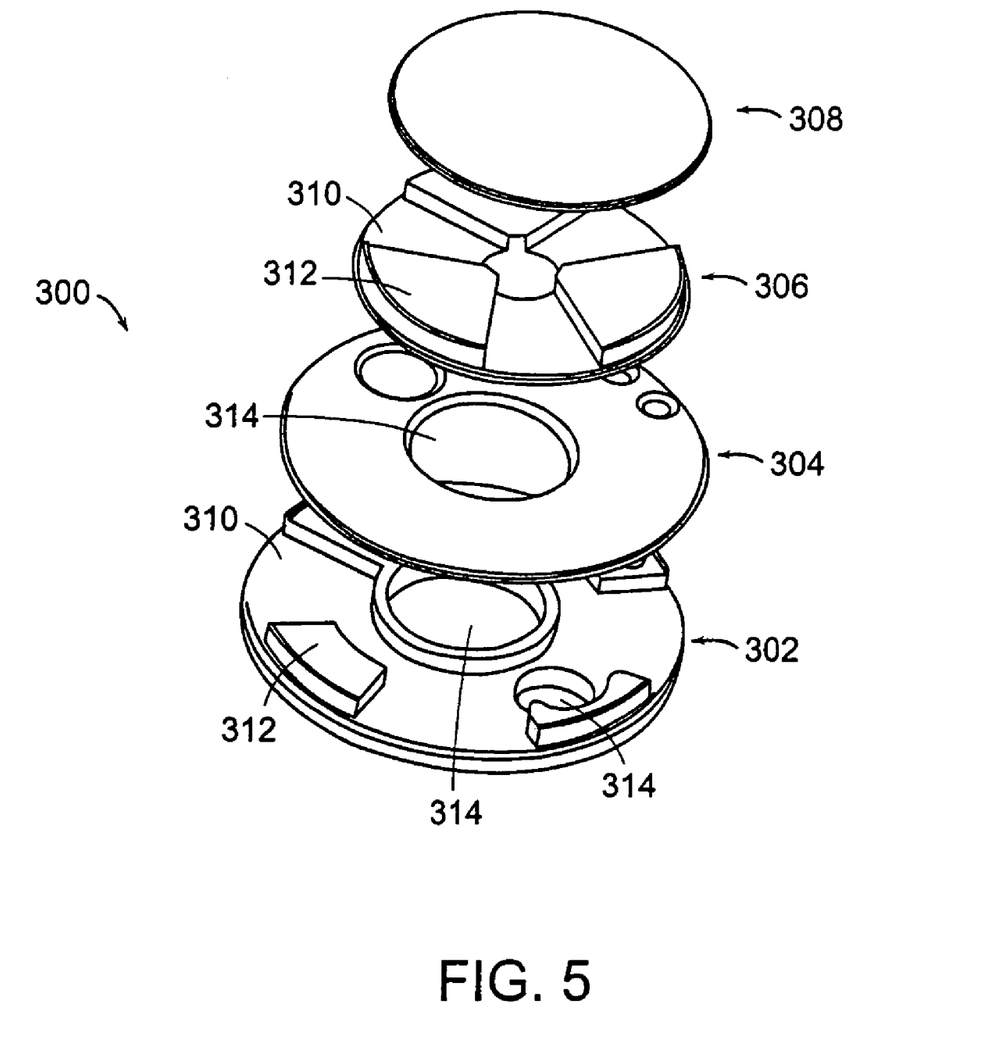
FIG. 5 is an exploded view of an end cap assembly according to another embodiment of the present invention.

FIG. 5 shows another embodiment of an end cap (300) in an expanded view. In this embodiment, the plates (302,304, 306,308) of the end cap (300) have channels (310) created on the plates (302,306) between raised portions (312). Fluids can be routed through the channels (310). In addition, inlets (314) allow materials to be inlet and outlet through the end cap (300). In another embodiment of the present invention, which is not shown, a solid end cap may be used. In such an embodiment, inlets and outlets to zones which are located between shells is provided by tubes running through the shells.

Another embodiment of a multi shelled reactor (200) is disclosed in FIG. 4. Annular zones (201, 202, 203,204) are located in the gaps between the shells (205,206,207,208, 209). Inside shell 209 are two components, an HTS (212) and an ATR zone (213). These components are separated by a mixing area (217,218) and a vaporization area (219). Tube (216) carries water to be evaporated in the hot reformate flowing from the ATR (213). Tube (214) is an inlet for a fuel/steam mixture into the ATR (213). This fuel/steam mixture is preheated in coiled tubes (232,222) and is connected by manifolding (not shown) to tube (214). In another embodiment, the fuel and steam may be combined earlier. In such a reactor they may be combined prior to introduction to the reactor. Air enters at air inlet (220) and flows through zone (203) and returns through zone (204), and is heated through the shell (209,208) walls by heat generated in the ATR (213), the HTS (214), and the integrated burner (211).

The oxygen containing gas flows out of zone (204) over circular tube (214), mixing with the fuel/steam mixture which flows from tube (214). The fuel/steam/air mixture then enters the ATR (213) and simultaneously generates heat and is reformed. The reformate leaves the ATR (213) at area (223) and mixes with additional water in zone. The water comes from tube (216) and is present in mixing area(217), where the water from tube (216) is atomized, and is evaporated at area (223) by the hot reformate. The reformate with additional steam passes over cooling coils in zone (218) (coils not shown), and passes into the HTS (212). The shifted reformate then exits the reformer at outlet (221).

Burner fuel in the form of anode exhaust enters the reformer (200) at inlet (224) and passes through zone (201), and is preheated there through shell (206) by heat from zone (202). The hydrogen is mixed with air introduced into chamber (225) and passes into burner (211), where heat is produced. The exhaust from the burner flows through zone (202) and over the coils of tubes (232, 222) in which the reformer fuel/steam mixture is flowing, and the cooled exhaust leaves the reformer at outlet (226). One expansion bellows (215) is provided, and is sufficient to prevent differential expansion from putting pressure on any of the shells.

According to another aspect of the invention, a plurality of coaxially arranged shells in a reactor for producing a hydrogen enriched product stream are provided with an end cap which provides as needed or desired: (1) termination of the zones created by the gaps between shells; (2) mechanical stability of the shells and their proper spacing; (3) a manifold for further routing of the process stream, heat transfer fluid, etc. upon leaving a coaxial zone; (4) routing of the process stream, heat transfer fluid, etc. into a coaxially arranged zone; (5) an inlet or outlet routing of the process stream, heat transfer fluid, etc. into or out of the reactor; or (6) a combination of all of the foregoing.

Such an end cap may be manufactured in a number of ways including casting, stamping, or the like. However, according to another aspect of the invention a novel structure and method of manufacture is contemplated for providing such an end cap.

FIGS. 3 and 5 both disclose utilizing a plate stack to form end caps (101) and (300) according to the invention. In a broad aspect, the plates are spaced and provide barriers for some zones, openings to the spaces between plates to others, and conduits such as pipes to yet others for through flow between plates or the spaces there between.

In particular, and by way of example FIG. 3 discloses an end cap (101) for use in a reactor nearly identical to reactor 10 with the following exception. End cap (101) is adapted for a reactor with only six coaxial zones whereas reactor 10 has seven such zones. The end cap 101 is disclosed herein to exemplify the use in a reactor such as reactor 10 wherein ATR air 16 and burner 20 air are preheated together within a single zone, thus eliminating one zone. FIG. 3 discloses the end cap (101) in various stages (a-g) of construction. A bottom perspective view of the fully assembled end cap (101) is shown by reference letter "g" while a top perspective view is shown by reference letter "h."

More particularly, FIG. 3 discloses a first plate (102) which is the outermost plate. The plate (102) has inlet/outlet pipes (106 a-d) of varying lengths extending from openings in plate (102). Plate (108) combines next to plate (102) and has openings (106a) corresponding to the pipes (106) of the plate (102). These pipes (106a-d) are located to correspond to openings (107a-d) of plate (108) when they are mated as shown by arrow "A:. As such the pipes (106a-d) transfer fluids past a space (107) between plates (106) and (108) as shown by reference letter "c" of FIG. 3. However, pipe (106d) does not extend beyond plate (108) an as such will provide fluid communication with a space (109) between a third plate (116) shown in reference letter "d" as mated to plates (102) and (108). In similar manner, pipes: (114) of plate (108), and pipes (106a and d) all extend through plate (116) for fluid communication with space (115) between plates (116) and (120) shown in the stack up referenced by letter "e." The sequence follows in like manner with respect to the additional plates (122,124) and pipes (106a) and (114).

The combination of conduit pipes, spaces, and openings provide the needed fluid connectivity to permit the multi shell arrangement to operate as described. The spaces act as conduits in a radial manner, whereas the pipes act as conduits for flow along axes parallel to axis (15).

It is noted that any suitable manner of attaching the plates together as well as those for connecting them to the shells can be used. However, repair and manufacturing should be considered in the choice. For example welding provides a reliable connection and seal between plates and shells but may not be as convenient as other methods for repair.

FIG. 5 shows another embodiment of an end cap (300) for particular use with reactor (200). In particular, plates (302, 304,306,308) of the end cap (300) have channels (310) created on the plates (302,306) between raised portions (312). Fluids can be routed radially through the channels (310). In addition, inlets (314) allow materials to be inlet and outlet through the end cap (300). In another embodiment of the present invention, which is not shown, a solid end cap may be used. In such an embodiment, inlets and outlets to zones which are located between shells is provided by tubes running through the shells.

While the invention has been described herein by reference to the preferred embodiments, other modifications to these embodiments as well as numerous other embodiments come to mind without departing from the invention. It should also be noted that embodiments not taking advantage of every aspect of advantage of the invention may nonetheless provide improved structures and methods over the art.

We claim:

1. A reactor for generating a hydrogen-rich reformate from hydrocarbons, comprising:

a core reaction zone having an outer wall, the core reaction zone configured to conduct at least one exothermic reaction and at least one fuel reforming reaction;

at least four shells arranged concentrically about the outer wall of the core reaction zone, a gap being defined between the outer wall of the core reaction zone and each of the successive shells to form a plurality of coaxial zones, the shells being configured to permit heat transfer directly between each adjacent zone, including the core reaction zone;

at least four fluid flows, each in a different coaxial zone, wherein at least two of the fluid flows comprise a reactant that is heated from a first temperature to a second higher temperature by traversing a coaxial zone, and wherein at least one of the fluid flows comprises a hot product of a reaction that is cooled from an initial elevated temperature to a second cooler temperature by traversing a coaxial zone.

2. The reactor of claim 1 wherein one of the at least one exothermic reaction comprises a burner and wherein exhaust from the burner is flowed through one of the at least four shells for heat exchange with one or more other zones.

3. The reactor of claim 1 wherein at least one of the at least four fluid flows is countercurrent to fluid flows in other concentric shells.

4. The reactor of claim 1 wherein the gaps of the plurality of coaxial zones are configured such that the fluid flow in each zone is predominantly turbulent.

5. The rector of claim 1 wherein the gaps of the plurality of coaxial zones are maintained by spacers placed between successive shells.

6. The reactor of claim 5 wherein spacers are selected from the group including: dimples; rods; flat screens; or undulating screens.

7. The reactor of claim 1 wherein the at least one fuel reforming reaction includes a steam reforming reaction.

8. The reactor of claim 1 wherein the second higher temperature is a temperature suitable for a reaction of the reactant.

* * * * *